(12) United States Patent
Nikitin et al.

(10) Patent No.: US 7,692,893 B2
(45) Date of Patent: Apr. 6, 2010

(54) SIDE-BY-SIDE MAGNETIC HEAD CONFIGURATION WITH FLARED POLE TIP LAYER AND READ SENSOR SHARING SAME PLANE

(75) Inventors: Vladimir Nikitin, Campbell, CA (US); Samuel Wei-san Yuan, Saratoga, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 897 days.

(21) Appl. No.: 10/884,367

(22) Filed: Jun. 30, 2004

(65) Prior Publication Data

US 2006/0002016 A1 Jan. 5, 2006

(51) Int. Cl.
- *G11B 5/265* (2006.01)
- *G11B 5/29* (2006.01)
- *G11B 5/31* (2006.01)
- *G11B 5/39* (2006.01)

(52) U.S. Cl. .............. 360/121; 360/125.07; 360/125.1
(58) Field of Classification Search ................ 360/121, 360/122, 125, 126, 125.07, 125.1, 125.14, 360/317

See application file for complete search history.

(56) References Cited

U.S. PATENT DOCUMENTS

| | | | |
|---|---|---|---|
| 4,511,942 A | 4/1985 | Valstyn | |
| 4,782,415 A | 11/1988 | Vinal | |
| 5,045,961 A | 9/1991 | Kobayashi et al. | |
| 5,065,483 A | 11/1991 | Zammit | |
| 5,210,667 A | 5/1993 | Zammit | |
| 5,229,901 A | 7/1993 | Mallary | |
| 5,331,493 A | 7/1994 | Schwarz | |
| 5,452,165 A | 9/1995 | Chen et al. | |
| 6,330,127 B1 * | 12/2001 | Sasaki | ........................ 360/126 |
| 6,392,840 B1 | 5/2002 | Chen | |

(Continued)

FOREIGN PATENT DOCUMENTS

| | | |
|---|---|---|
| EP | 0 821 348 A2 | 1/1998 |
| JP | 6119619 | 4/1994 |
| JP | 6162437 | 6/1994 |
| JP | 6223310 | 8/1994 |
| JP | 10228608 | 8/1998 |
| JP | 10269526 | 10/1998 |

OTHER PUBLICATIONS

IBM Technical Disclosure Bulletin, "Self-Aligned Write Throat/Read Stripe for Side-by-Side Head," vol. 40, No. 8, Aug. 1997, pp. 5-6.

(Continued)

*Primary Examiner*—Craig A. Renner
(74) *Attorney, Agent, or Firm*—Merchant & Gould

(57) ABSTRACT

A method and apparatus for processing sub-micron write head flare definition is provided. The method for processing a perpendicular magnetic head forms a portion of a perpendicular write head, where the portion of the write head includes a first pole layer, a coil layer, a second pole layer and a write pole, the method forms a portion of a magnetic read head adjacent to the portion of the perpendicular write head, where the portion of the read head includes a shield layer and a sensor, the method also laps the write pole concurrently with the sensor to define a flare position of the pole tip and to define a sensor height, where the flare position of the pole tip is defined in the same photo-lithography step as the back edge of the sensor.

6 Claims, 7 Drawing Sheets

U.S. PATENT DOCUMENTS

| | | |
|---|---|---|
| 6,636,390 B2 | 10/2003 | Funayama et al. |
| 2002/0080525 A1* | 6/2002 | Sato et al. .................. 360/126 |
| 2003/0016474 A1 | 1/2003 | Biskeborn |
| 2003/0021063 A1 | 1/2003 | Kuroda et al. |
| 2003/0137779 A1* | 7/2003 | Santini et al. ............... 360/126 |
| 2003/0156355 A1 | 8/2003 | Yoda et al. |
| 2003/0214763 A1 | 11/2003 | Childress et al. |
| 2004/0246621 A1* | 12/2004 | Maruyama et al. .......... 360/126 |
| 2005/0024766 A1* | 2/2005 | Khera et al. ................ 360/125 |
| 2005/0024771 A1* | 2/2005 | Le ............................ 360/126 |

OTHER PUBLICATIONS

IBM Technical Disclosure Bulletin, "Thin Film Magnetic Head Assembly," Sep. 1981, pp. 1912-1913.

IBM Technical Disclosure Bulletin, "Thin Film Head Assembly with Side by Side Elements," Sep. 1981, pp. 1910-1911.

* cited by examiner

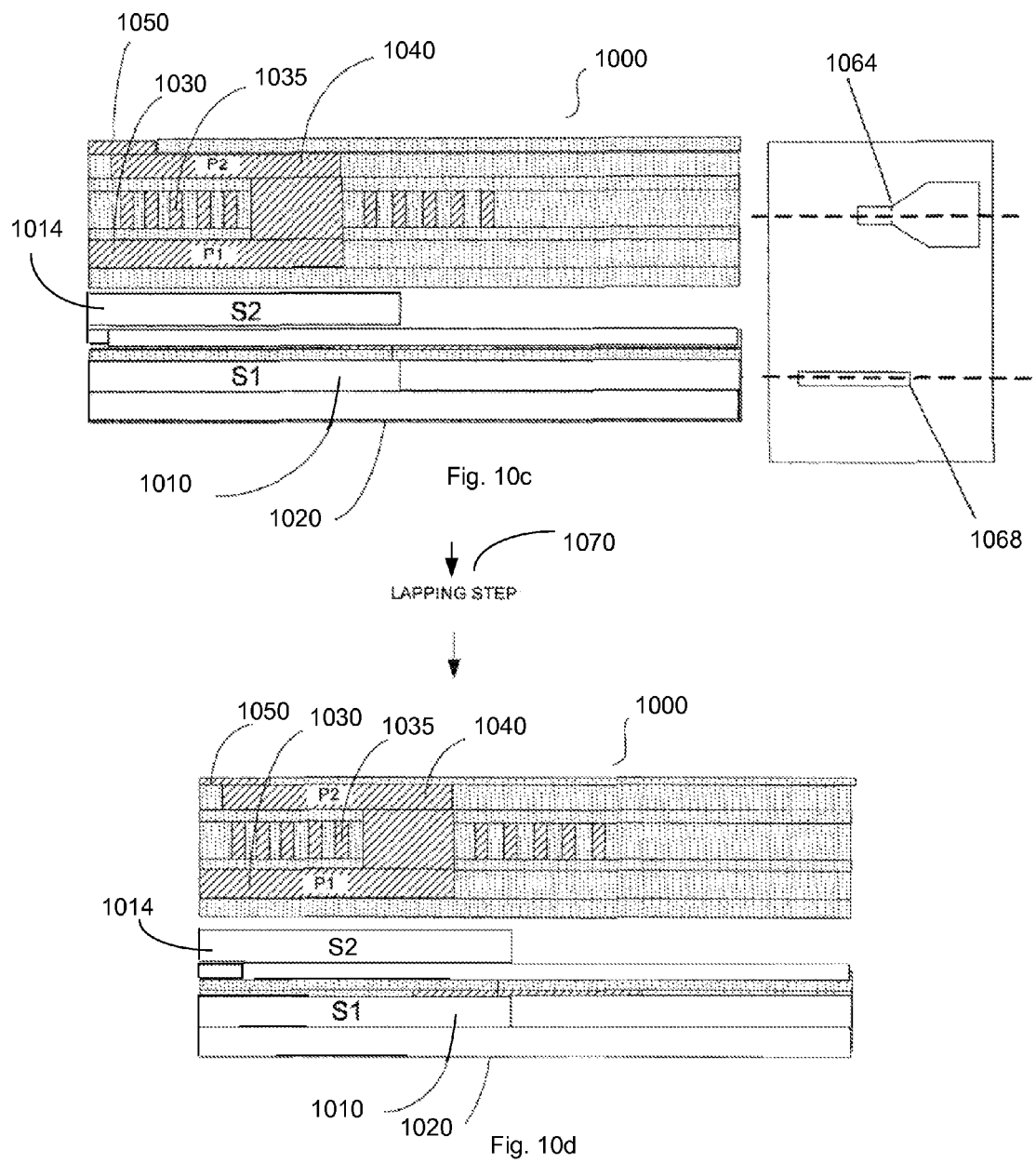

SIDE-BY-SIDE MAGNETIC HEAD CONFIGURATION WITH FLARED POLE TIP LAYER AND READ SENSOR SHARING SAME PLANE

BACKGROUND OF THE INVENTION

1. Field of the Invention

The present invention relates in general to magnetic recording systems, and more particularly to magnetic recording systems having write heads with improved flare definition and method of its manufacture.

2. Description of the Related Art

Fixed magnetic storage systems are now commonplace as a main non-volatile storage in modern personal computers, workstations, and portable computers. Storage systems are now capable of storing gigabyte quantities of digital data, even when implemented in portable computers.

As disk drive technology progresses, more data is compressed into smaller areas. Increasing data density is dependent upon read/write heads fabricated with smaller geometries capable of magnetizing or sensing the magnetization of correspondingly smaller areas on the magnetic disk. The advances in magnetic head technology has led to heads fabricated using processes similar to those used in the manufacture of semiconductor devices.

A typical disk drive is comprised of a magnetic recording medium in the form of a disk for storing information, and a magnetic read/write head for reading or writing information on the disk. The disk rotates on a spindle controlled by a drive motor and the magnetic read/write head is attached to a slider supported above the disk by an actuator arm. When the disk rotates at high speed a cushion of moving air is formed lifting the air bearing surface (ABS) of the magnetic read/write head above the surface of the disk.

The read portion of the head is typically formed using a magnetoresistive (MR) element including giant magnetoresistive heads in current in- and perpendicular- to plane configurations, and sensor using tunneling current. This element is a layered structure with one or more layers of material exhibiting the magnetoresistive effect. The resistance of a magnetoresistive element changes when the element is in the presence of a magnetic field. Data bits are stored on the disk as small, magnetized region on the disk. As the disk passes by beneath the surface of the magnetoresistive material in the read head, the resistance of the material changes and this change is sensed by the disk drive control circuitry.

The write portion of a read/write head is typically fabricated using a coil embedded in an insulator between a top and bottom magnetic layer. The magnetic layers are arranged as a magnetic circuit, with pole tips forming a magnetic gap at the air bearing surface of the head. When a data bit is to be written to the disk, the disk drive circuitry sends current through the coil creating a magnetic flux. The magnetic layers provide a path for the flux and a magnetic field generated at the pole tips magnetizes a small portion of the magnetic disk, thereby storing a data bit on the disk.

The process for fabricating the write portion of a read/write head typically uses processes that define the width of pole tips. Furthermore, write head flare, which is the area where the second pole piece begins to widen above the air bearing surface, is not well defined due to limited capability of alignment in optical lithography. Because flare point placement directly affects the magnitude of the write field at the recording medium, inaccurate placement of the flare point can result in non-functioning head. This situation is especially serious for perpendicular recording, since the required accuracy of the flare position exceeds the processing tolerances, resulting in enormous yield loss in head fabrication.

It can be seen therefore, that there is a need for a method of defining write head flare with high degree of accuracy.

SUMMARY OF THE INVENTION

To overcome the limitations in the prior art described above, and to overcome other limitations that will become apparent upon reading and understanding the present specification, the present invention discloses a method for controlling write head flare in the process of fabricating heads for perpendicular recording utilizing a side-by-side read/write geometry.

The present invention solves the above-described problems by providing a method for defining a perpendicular magnetic head with sub-micron write head flare definition by simultaneously defining the write head flare and the back edge of the sensor in one optical lithography step. Then, using conventional method to lap to the target sensor stripe height ensures accuracy of the flare position of the write head.

A method for defining a perpendicular magnetic head according to an embodiment of the present invention includes forming a portion of the read and write head including the first shield layer, the read gap, first and second pole layers, and a coil layer, depositing the sensor film on the surface only over the region of the read head, depositing a full-film shaping pole layer over the write head, defining the track width of the sensor, patterning of a photoresist to define the pole tip of the write head including write track width and flare position, and at the same time to define the back edge of the sensor, removing material of the sensor and pole tip from the areas not covered by photoresist, completing the fabrication of the write and read head layers and lapping the write pole concurrently with the sensor to define a flare position of the pole tip and to define a sensor height with accurate positioning of write head flare.

In another embodiment of the present invention, a perpendicular magnetic head is provided. The perpendicular magnetic head includes a perpendicular write head comprising a first pole layer, a coil layer, a second pole layer and a write pole having a pole tip layer and a surface merging with the second pole layer and a magnetic read head disposed adjacent to the perpendicular write head, wherein the magnetic read head comprises a shield layer and a sensor, the sensor being formed in a same plane as the pole tip layer, wherein the write pole and the magnetic read head include a common lapped surface defining a flare position of the pole tip and a sensor height, wherein the flare position of the pole tip is defined at the point where the pole tip and the second pole layer merge.

In another embodiment of the present invention, a magnetic storage system is provided. The magnetic storage system includes at least one moveable magnetic storage medium, at least one read/write magnetic head disposed adjacent the at least one moveable magnetic storage medium and an actuator assembly, coupled to the at least one read/write magnetic read/write head, for moving the at least one magnetic read/write head relative to the at least one moveable magnetic storage medium, wherein the at least one read/write magnetic head includes a perpendicular write head comprising a first pole layer, a coil layer, a second pole layer and a write pole having a pole tip layer and a surface merging with the second pole layer and a magnetic read head disposed adjacent to the perpendicular write head, wherein the magnetic read head comprises a shield layer and a sensor, the sensor being formed in a same plane as the pole tip layer, wherein the write pole and the magnetic read head include a common lapped surface defining a flare position of the pole tip and a sensor height, wherein the flare position of the pole tip is defined at the point where the pole tip and the second pole layer merge.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIGS. 10a-d show cross-sectional and wafer views of the fabrication of a perpendicular write head with improved flare definition according to an embodiment of the present invention.

DETAILED DESCRIPTION OF THE INVENTION

In the following description of the exemplary embodiment, reference is made to the accompanying drawings, which form a part hereof, and in which is shown by way of illustration the specific embodiment in which the invention may be practiced. It is to be understood that other embodiments may be utilized as structural changes may be made without departing from the scope of the present invention.

In embodiment of the present invention methods for processing a side-by-side read/write head in order to achieve a high degree of write head flare precision is provided. The point where the pole tip and head merge is called the flare point because the pole tip begins to widen as it recesses into the head. Similarly, a flare point can be described as the area where the second pole piece begins to widen (flare) above the air bearing surface at the bottom of the yoke. Thus, achieving a high precision of write head flare involves precisely defining the flare point situated above the air bearing surface.

Accurately defining the flare point of a write head is an important design parameter. Magnetic flux decays as it travels down the length of the second pole tip. Thus, more flux will reach the recording media if the length of the second pole tip is made short. Placing a flare point near the air bearing surface of a write head can lead to the ability to make the second pole tip shorter and enable more flux to reach the recording media thereby optimizing performance. In the past it has been difficult to locate the flare point closer to the ABS than 0.5-1 µm due to fabrication problems associated with the pole tip.

Figure 1:
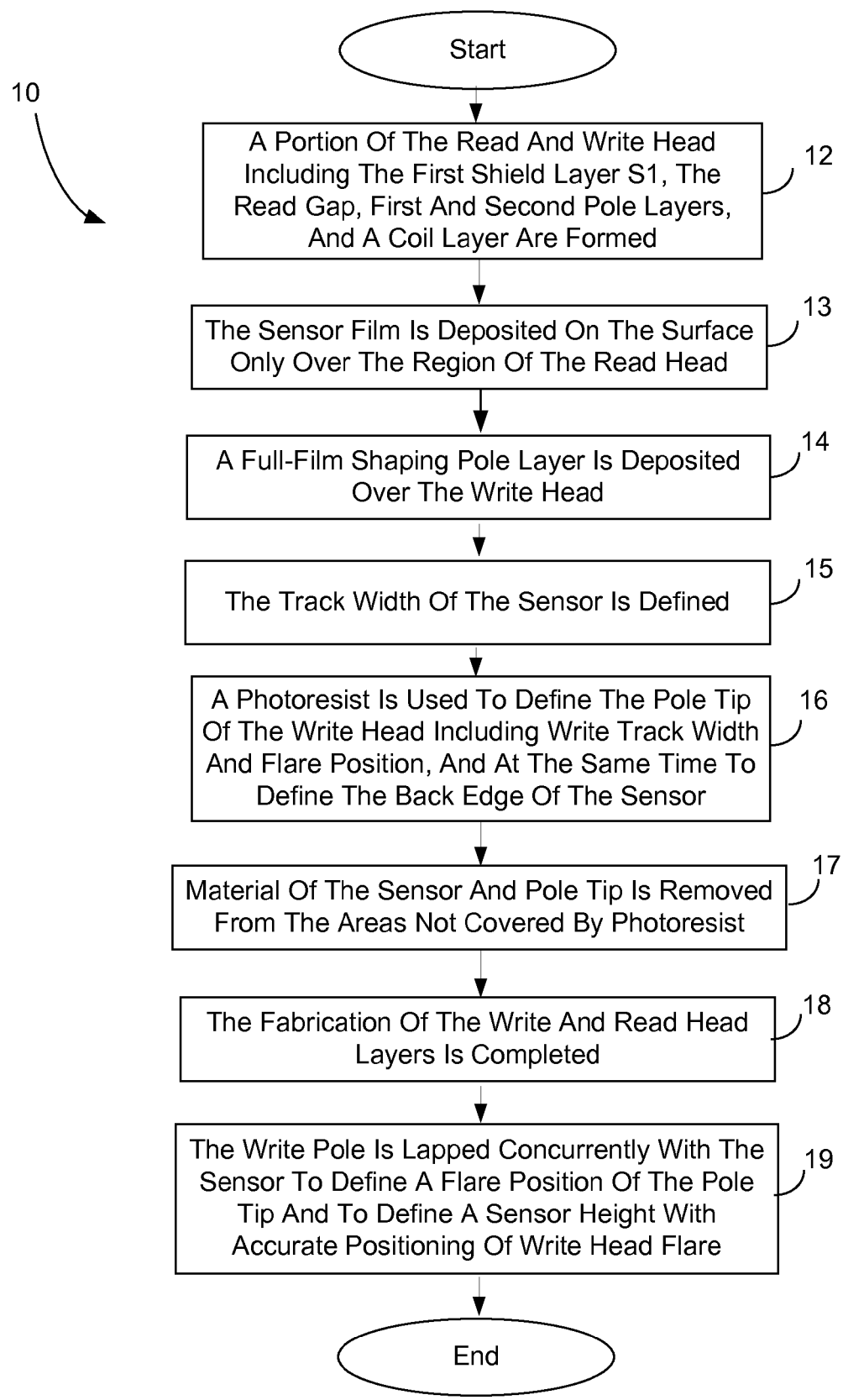
FIG. 1 is a flowchart of a method for fabricating read/write heads using a precise method to define write head pole tip flare according to an embodiment of the present invention.

FIG. 1 is a flowchart 10 of a method for fabricating read/write heads according to an embodiment of the present invention. In FIG. 1, a portion of the read and write head including the first shield layer S1, the read gap, first and second pole layers, and a coil layer are formed 12. Then, the sensor film is deposited on the surface only over the region of the read head 13. A full-film shaping pole layer is deposited over the write head 14. The track width of the sensor is defined 15. A photoresist is used to define the pole tip of the write head including write track width and flare position, and at the same time to define the back edge of the sensor 16. Material of the sensor and pole tip is removed from the areas not covered by photoresist 17. The fabrication of the write and read head layers is completed 18. The write pole is lapped concurrently with the sensor to define a flare position of the pole tip and to define a sensor height with accurate positioning of write head flare 19.

Figure 2:
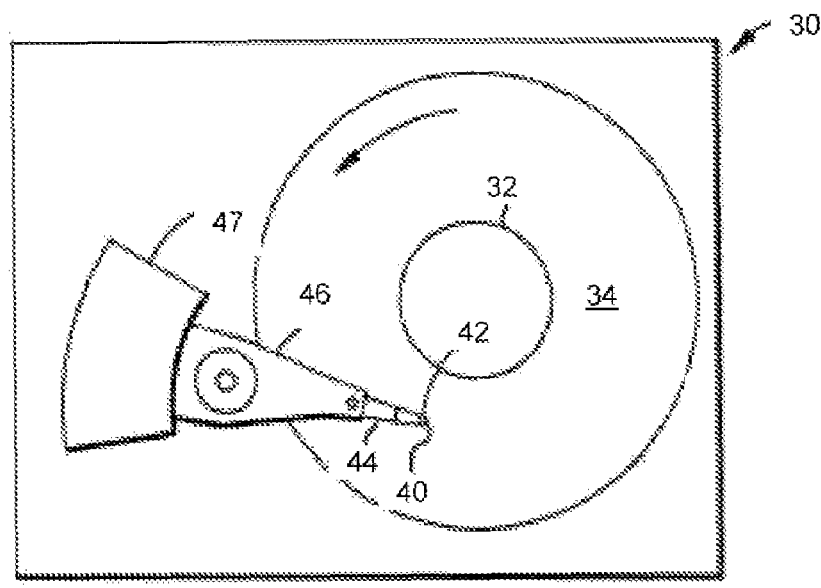
FIG. 2 is a plan view of an exemplary prior art magnetic disk drive.
Figure 3:
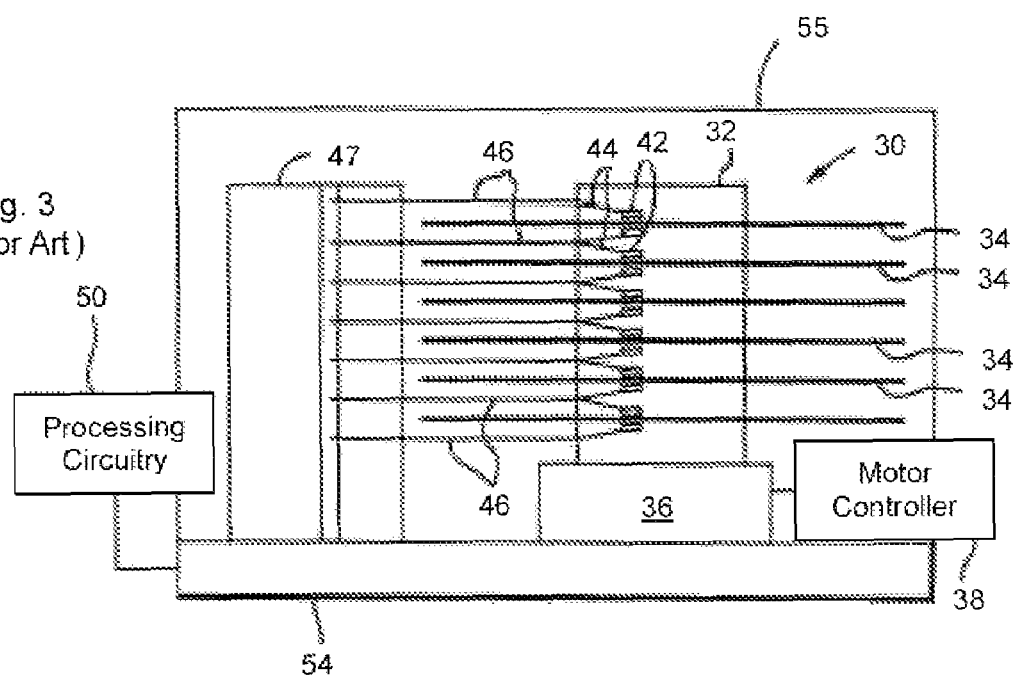
FIG. 3 is an elevation view of the prior art magnetic disk drive wherein multiple disks and magnetic heads are employed.
Figure 4:
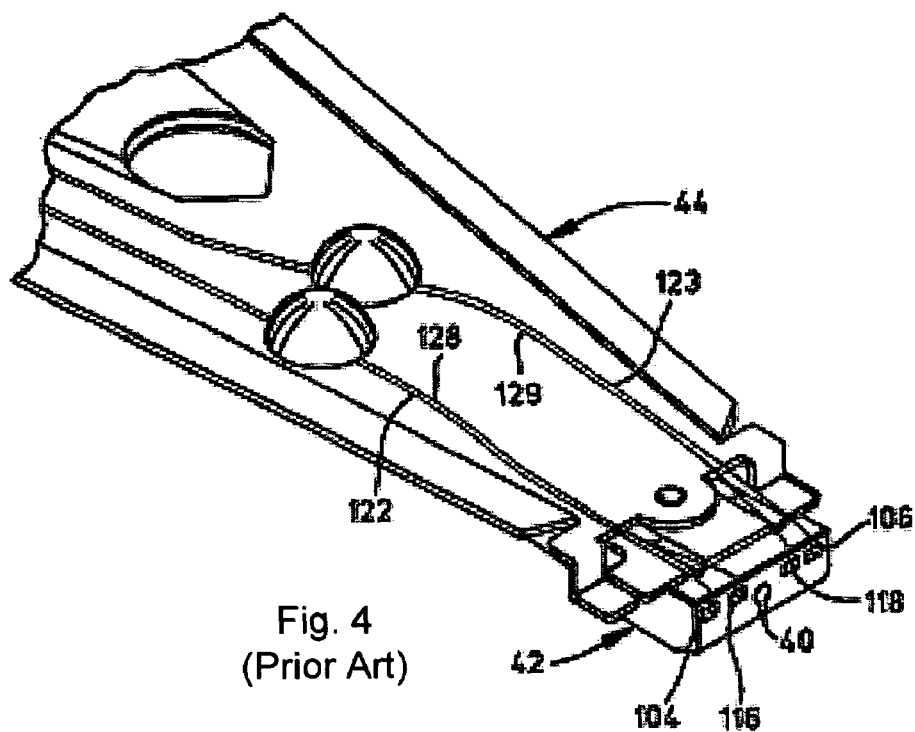
FIG. 4 is an isometric illustration of an exemplary prior art suspension system for supporting the slider and magnetic head.

Side-by-side read/write heads fabricated in accordance with the present invention can be incorporated into magnetic disk drives. FIGS. 2-4 illustrate an exemplary magnetic disk drive 30 where like reference numerals designate like or similar parts throughout the several views. The drive 30 includes a spindle 32 that supports and rotates a magnetic disk 34. The spindle 32 is rotated by a spindle motor 36 that is controlled by a motor controller 38. A slider 42 has a combined read/write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. First and second solder connections 104 and 106 connect leads from the sensor 40 to leads 122 and 123, respectively, on suspension 44 and third and fourth solder connections 116 and 118 connect to the write coil (not shown) to leads 128 and 129, respectively, on suspension 44.

When the spindle motor 36 rotates the disk 34 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
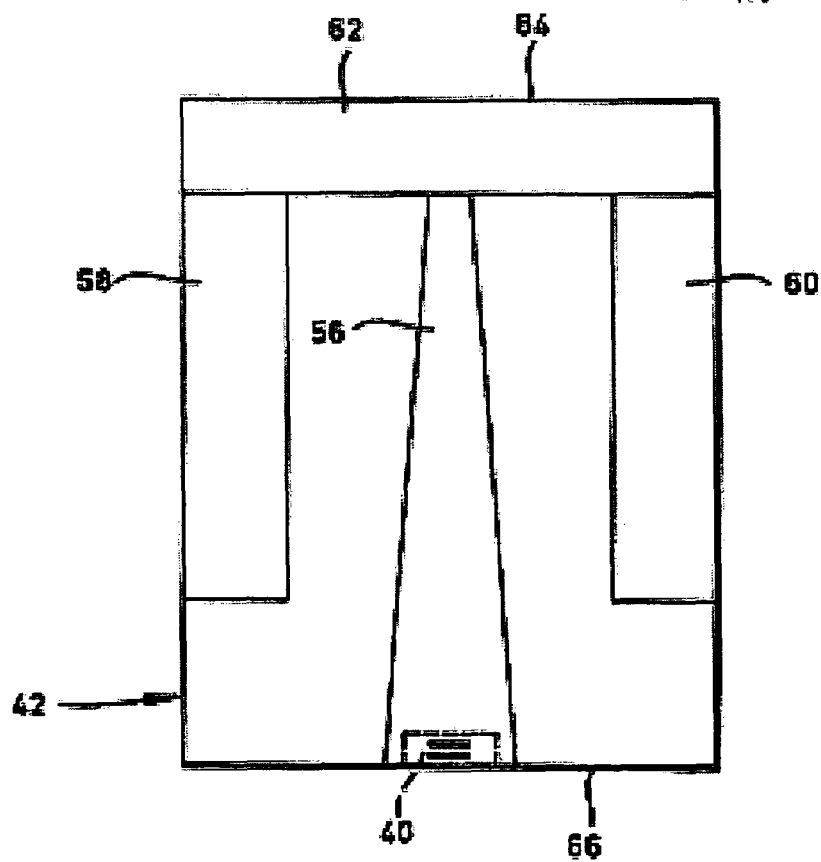
FIG. 5 is an ABS view of the magnetic head.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
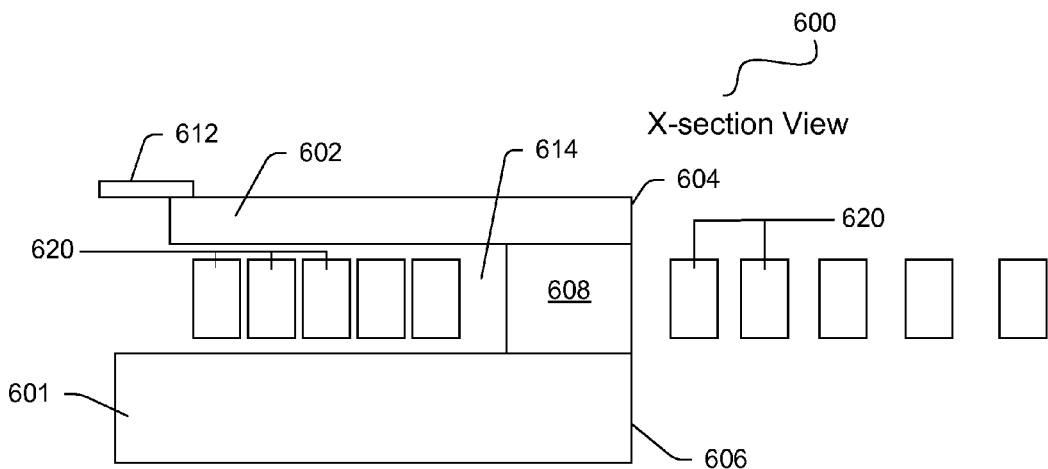
FIG. 6 is a cross-sectional view of a perpendicular write head that can be used in accordance with embodiments of the invention.

FIG. 6 is a cross-sectional view of a write head that can be incorporated in side-by-side read/write heads in accordance with the present invention. The write head 600 includes first and second pole pieces 601 and 602 which extend from the ABS to back gap portions 604 and 606 which are recessed in the head and which are magnetically connected to a back gap layer 608. The second pole piece 602 includes a leading edge tapered pole tip layer (PT layer) 612. Located between the first and second pole pieces 601 and 602 is an insulation layer 614 which extends from the ABS to the back gap layer 608 and has embedded therein at least one write coil layer 620. A bottom portion of insulation layer 614 insulates the write coil from the first pole piece 601.

Figure 7:
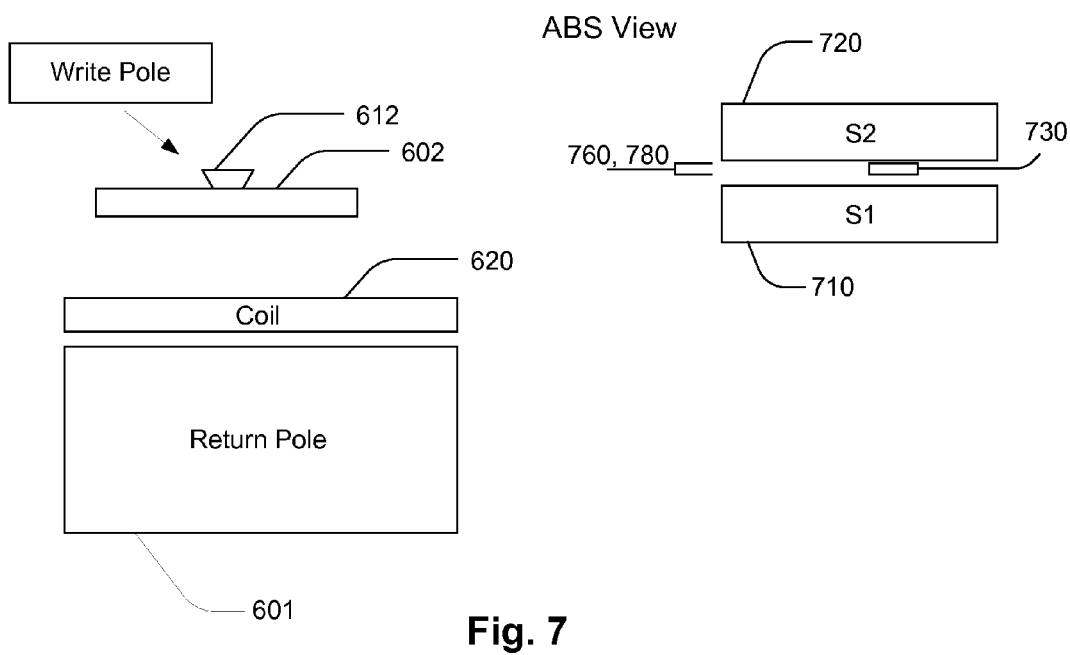
FIG. 7 is an ABS view of a perpendicular write head side-by-side with a read head in accordance with an embodiment of the invention.

In accordance with the present invention, FIG. 7 illustrates a side-by-side write/read head as viewed from the air bearing surface. The read head sensor 730 is sandwiched between nonmagnetic electrically nonconductive first and second read gap layers 760 and 780, and the read gap layers are sandwiched between ferromagnetic first (S1) and second (S2) shield layers 710 and 720. In response to external magnetic fields, the resistance of the sensor 730 changes. The write head of FIG. 7 is an alternate view of the write head depicted in FIG. 6. The write head includes first and second pole pieces 601 and 602, pole tip 612 and coil 620.

Figure 8:
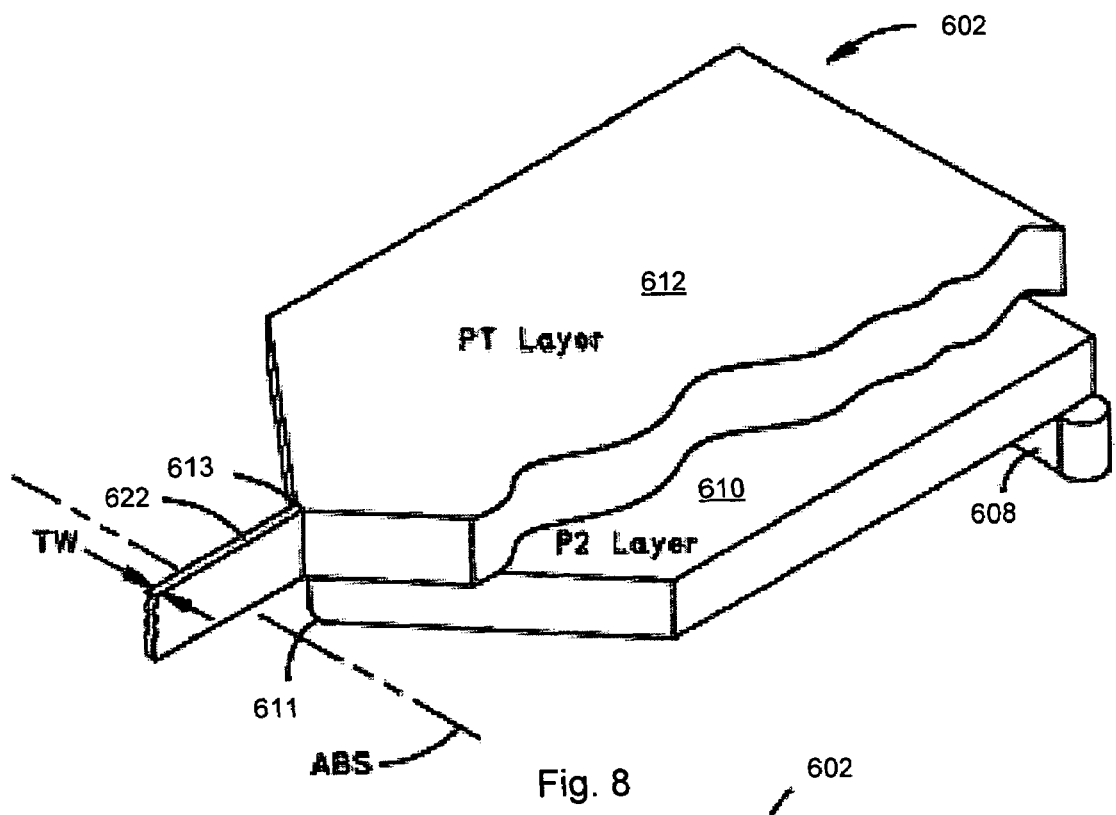
FIG. 8 is an isometric view of a second pole piece of FIG. 7, which includes a bottom pole piece and a top pole tip layer in accordance with an embodiment of the invention.
Figure 9:
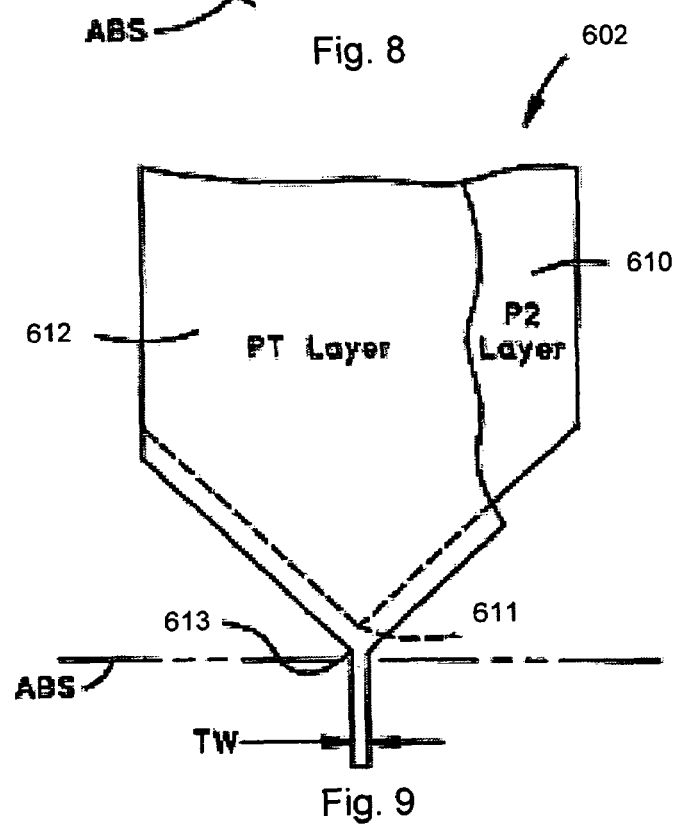
FIG. 9 is a top view of FIG. 8.

As shown in FIGS. 8 and 9, the second pole piece 602 includes the bottom second pole piece (P2) layer 610 and the top ferromagnetic pole tip (PT) layer 612. The layers 610 and 612 have flare points 611 and 613 where the layers first commence to extend laterally outwardly after the ABS. The pole tip layer 612 has a pole tip 622 and a yoke, which is, located between the pole tip 622 and the back gap 608. The width of the pole tip 622 is the track width (TW) of the recording head.

In a side-by-side configuration, a read/write head can be fabricated in a variety of ways. FIGS. 10*a-d* show cross-sectional and wafer views of the fabrication of a perpendicular write head 1000 with improved flare definition according to an embodiment of the present invention. In FIGS. 10*a-d*, the left portion is the cross-sectional view indicated by the dashed lines in the wafer view shown on the right.

Figure 10A:
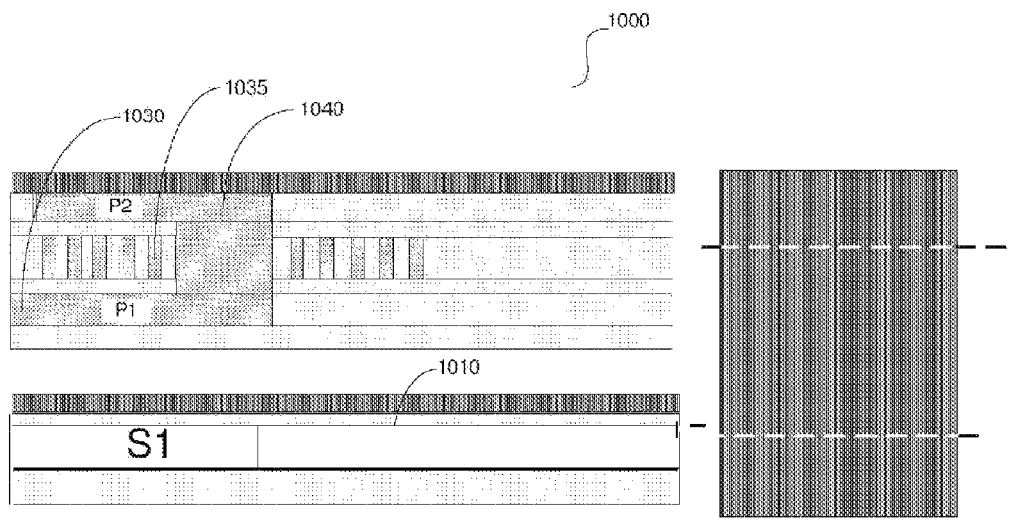

In FIG. 10*a*, a portion of the read and write head is formed, including the first shield layer S1 1010, and the portion of the write head including first and second pole layers 1030 (P1), 1040 (P2), and a coil layer 1035 as shown in FIG. 10*a*. The top of the write head layer P2 is at the same level as the top of first read gap layer 1012 of the read head. Then, the sensor GMR or TMR film is deposited on the surface, but is left only over the region of the read head. This is done by either lift-off technique or by ion-milling the sensor material in the area of the write head. Then, using a lift-off technique, the full-film shaping pole layer 1050 is deposited over the write head. The material used for shaping layer is CoFe or laminated CoFe, or any other pole tip layer material, preferably of magnetic material with high saturation moment. Then, the track width of the sensor 1020 is defined using standard techniques for read head processing, including electrical connection leads and hard bias stabilization layer (not shown).

Figure 10B:
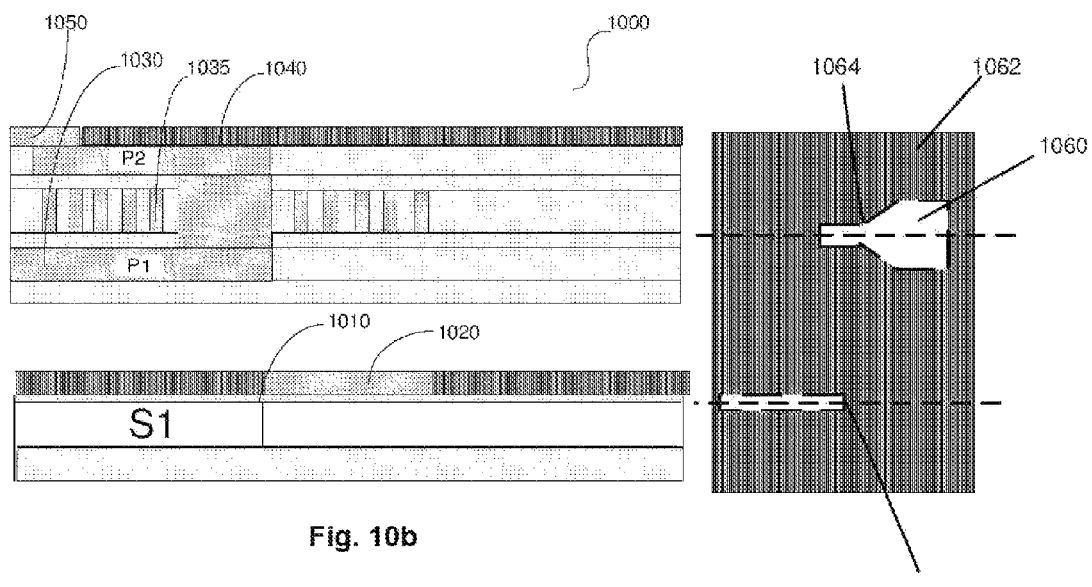

The right side of FIG. 10*b* shows the patterning of a photoresist using the same lithographic step described above. In FIG. 10*b*, the photoresist 1060 is the unshaded area and the shaded area 1062 represents the wafer surface with the photoresist removed. This step defines the pole tip of the write head, including write track width and flare position, and at the same time defines the back edge of the sensor 1020. Using ion milling, material of the sensor 1020 and pole tip 1050 is removed from the areas not covered by photoresist 1060 defined in the previous step. After milling is completed, the sensor stripe height and the write poles are defined. Referring to FIG. 10*c*, the wafer portion of head fabrication is then concluded by depositing second sensor gap layer 1014, which is topped by the second shield S2 over the read head.

FIG. 10*d* shows the lapping step. Since the sensor stripe 1020 and the write pole 1050 are both defined at the same lithographic step, the position of write pole flare 1064 is defined with unprecedented accuracy with respect to the sensor back edge 1068. Other conventional steps used in head processing can be used to complete formation of the head. Defining the pole tip layer 1050 in the same plane as the sensor layer 1020 allows for accurate positioning of write head flare 1064 because in the lapping step 1070, tolerances within 20 nm can be achieved for current processes, and a 5 nm tolerance can be achieved in single slider lapping.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A perpendicular side-by-side magnetic head, comprising:
   a perpendicular write head comprising a first pole, a coil layer, and a second pole, wherein the first pole includes a pole tip layer and a flared layer, the pole tip layer including a first portion defined by a pole tip having a width defining a track width and a second portion defined by a flare point wherein the second portion widens from the width defining the track width, the pole tip layer and the flared layer merging along the length of only the second portion of the pole tip layer; and
   a magnetic read head disposed adjacent to the perpendicular write head, wherein the magnetic read head comprises a shield layer and a sensor, the sensor and pole tip being formed in a same plane defined by the width of the pole tip layer;
   wherein the first pole and the magnetic read head include a common lapped surface defining a sensor height and a desired distance between the flare point and the lapped surface.

2. The perpendicular side-by-side magnetic head of claim 1, wherein the desired distance between the flare point and the lapped surface is 100 nm.

3. The perpendicular side-by-side magnetic head of claim 1, wherein the sensor height has a tolerance of substantially 20 nm.

4. A magnetic storage system, comprising:
   at least one moveable magnetic storage medium;
   at least one read/write side-by-side magnetic head disposed adjacent the at least one moveable magnetic storage medium; and
   an actuator assembly, coupled to the at least one read/write side-by-side magnetic head, for moving the at least one read/write side-by-side magnetic head relative to the at least one moveable magnetic storage medium;
   wherein the at least one read/write side-by-side magnetic head comprises:
      a perpendicular write head comprising a first pole, a coil layer, and a second pole, wherein the first pole includes a pole tip layer and a flared layer, the pole tip layer including a first portion defined by a pole tip having a width defining a track width and a second portion defined by a flare point wherein the second portion widens from the width defining the track width, the pole tip layer and the flared layer merging along the length of only the second portion of the pole tip layer; and a magnetic read head disposed adjacent to the perpendicular write head, wherein the magnetic read head comprises a shield layer and a sensor, the sensor and pole tip layer being formed in a same plane defined by the width of the pole tip layer;

wherein the first pole and the magnetic read head include a common lapped surface defining a sensor height and a desired distance between the flare point and the lapped surface.

5. The magnetic storage system of claim 4, wherein the desired distance between the flare point and the lapped surface is 100 nm.

6. The magnetic storage system of claim 4, wherein the sensor height has a tolerance of substantially 20 nm.

* * * * *